Patented May 14, 1929.

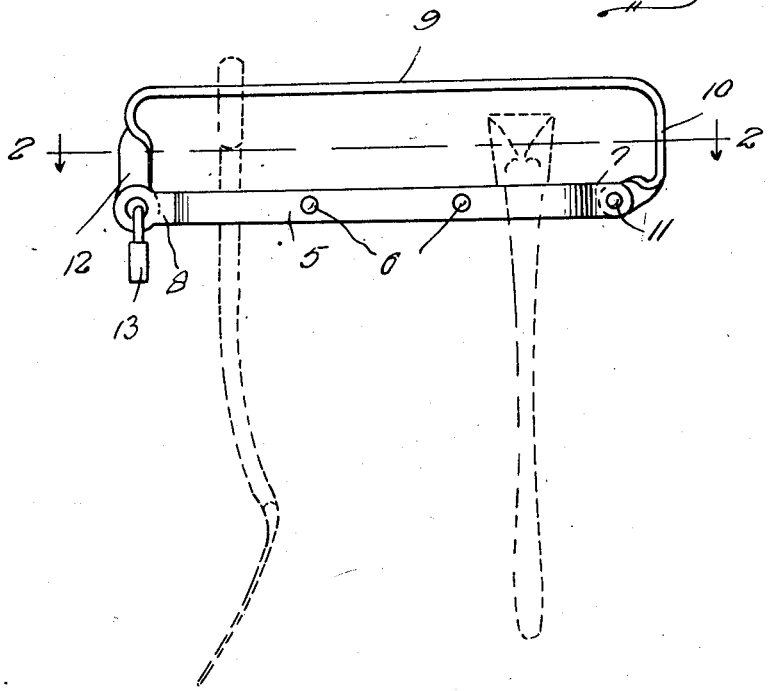
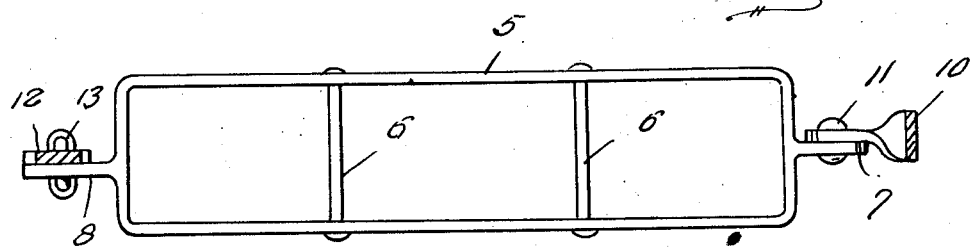

1,713,230

UNITED STATES PATENT OFFICE.

EMMETT HUNT, OF LEMONT FURNACE, PENNSYLVANIA.

TOOL HOLDER.

Application filed February 25, 1927. Serial No. 171,049.

The present invention relates to a tool holder and has for its principal object to provide a structure in which a plurality of tools, implements and the like may be stored and locked against dispacement therefrom by unauthorized persons.

Another important object of the invention lies in the provision of a frame having pivotally engaged therewith a bar which may be locked to the frame for holding implements such as picks, axes, sledges and the like in the frame and the bar may be used for holding handles of shovels or the like.

A still further object of the invention lies in the provision of a tool holder which is exceedingly simple in its construction, easy to manipulate, thoroughly reliable and efficient in use, and otherwise well adapted to the purpose for which it is designed.

With the above and numerous other objects in view as will appear as the description proceeds, the invention resides in certain novel details of construction, and in the combination and arrangement of parts as will be hereiafter more fully described and claimed.

In the drawing:—

Figure 1 is a side elevation of a tool holder embodying the features of my invention, Fig. 2 is a longitudinal section taken substantially on the line 2—2 of Figure 1 looking in the direction of the arrow.

Referring to the drawing in detail, it will be seen that the numeral 5 denotes a rectangular frame preferably cast of metal and having cross members 6 mounted therein. On the ends of the frame 5 there are formed integrally outwardly extending apertured ears 7 and 8. A bar 9 is bent adjacent one end to extend perpendicularly therefrom as at 10 and the end of the portion 10 is twisted and apertured to receive a pivot pin or rivet 11 which passes through the apertured ear 7 to pivotally mount the bar 9 on the frame. The other end of the bar 9 is bent at right angles and twisted intermediate its ends to form a portion 12 which is apertured to register with the apertured ear 8 for the purpose of receiving a padlock 13. Picks, axes, sledges and like implements may be disposed with their handles projecting through the frame and their heads resting on the sides of the frame while shovels and the like may be disposed with their handles extending through the frame and the bar 9 extending through their handles. When the implements are thus disposed it will be seen that they cannot be displaced since, the heads of the axes, picks and sledges and the like are not large enough to be pulled through the spaces into which the interior of the frame is divided by cross members 6. It is thought that the construction, convenience, efficiency, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit and scope of the invention as hereinafter claimed or sacrificing any of its advantages.

Having thus described my invention, what I claim as new is:—

1. A device of the class described, comprising a rectangular frame having an apertured ear projecting from one end thereof, a second apertured ear projecting from the other end thereof, a bar having one end bent and terminating in an inwardly directed twisted portion apertured directly with the first apertured ear, a pivot connecting the apertured end and the apertured ear last-mentioned, the other end of the bar being twisted and bent and provided with an aperture to register with the other apertured ear to receive a padlock.

2. A device of the class described comprising a rectangular frame having apertured ears projecting from the ends thereof, a bar having off-set end extensions, one of said extensions being pivotally engaged with one ear and the other end extension being apertured to register with the aperture in the other ear for reception of locking means.

In testimony whereof I affix my signature.

EMMETT HUNT.